United States Patent [19]

Fortier

[11] 4,127,099
[45] Nov. 28, 1978

[54] FIREPLACE FUEL STOVE AND GRILL DEVICE

[76] Inventor: Gustave Fortier, 1120 2nd Ave., Quebec, Canada

[21] Appl. No.: 800,537

[22] Filed: May 25, 1977

[51] Int. Cl.² .............................................. F24B 1/26
[52] U.S. Cl. .................................. 126/137; 126/165; 126/336; 99/422; D7/207
[58] Field of Search ................ 126/126, 137, 164, 165, 126/336, 25 R, 25 A; 99/422; D7/207

[56] References Cited

U.S. PATENT DOCUMENTS

| D. 139,144 | 10/1944 | Kronenberg | 126/25 R |
|---|---|---|---|
| 1,202,891 | 10/1916 | Pruet | 126/336 |
| 1,385,931 | 7/1921 | Semonin | 126/165 |
| 1,521,204 | 12/1924 | Rollings | 126/164 |
| 3,447,530 | 6/1969 | Santeramo | 126/25 R |
| 3,583,309 | 6/1971 | Freidenrich | 126/25 A |
| 4,050,441 | 9/1977 | Horwinski | 126/165 |

FOREIGN PATENT DOCUMENTS 93,149  10/1938  Sweden ................................. 126/165

Primary Examiner—Ronald C. Capossela

[57] ABSTRACT

A device which selectively forms either a fireplace fuel stove or a cooking grill and which is characterized by its simple all metal knockdown construction to be readily transported for indoor or outdoor use. This fireplace and grill device includes a pair of opposite end members, a bottom, a front, and a rear plate extending between the opposite end members, hooks formed integral with these plates and removably connecting the latter to the end members, and grill plates removably engaging the upper portion of the rear plate and adjustable in height relative thereto.

1 Claim, 4 Drawing Figures

FIREPLACE FUEL STOVE AND GRILL DEVICE

This invention relates to a fireplace fuel stove of the type also usable as a cooking grill device.

The conventional fireplace grate holds the wood logs by means of a few spaced iron bars underneath allowing the red hot fire brands to roll over and fall into the colder ashes on the fireplace floor and where they continue to burn slowly. Full enjoyment of the burning logs is therefore lost.

The open type conventional grate can also damage the brick stone or metal walls of the fireplace because the flame is allowed to come in direct contact therewith.

Also the conventional grate requires that several logs burn simultaneously to produce a nice fire.

Those having a fireplace up to now have been buying both a conventional fireplace grate and a separate portable cooking grill when they wanted the advantages of both of these devices. The portable cooking grill like the fireplace grate is adopted to hold a fire. The portable cooking grill represents an additional cost to buy it and is an encumbrant item to be stowed away when not used.

It is the main object of the invention to provide a fireplace fuel stove, which burns solid fuel such as charcoal, briquettes and wood logs adopted to replace the conventional grate, and which is much more economical in the use of fuel while producing a lively fire in the fireplace.

It is an object of the present invention to provide a single device performing the function of both a fireplace fuel stove and a cooking grill.

It is a more specific object of the present invention to provide a fireplace fuel stove and grill device which is adapted to fit and be used in a fireplace like a conventional grate and to be transported and used as a separate cooking grill.

It is a further object of the present invention to provide a fireplace fuel stove and grill device which is of simple and all metal interlocking parts to be readily collapsible and transportable for indoor and outdoor use.

The above and other objects and advantages of the present invention will be better understood with reference to the following detailed description of a preferred embodiment thereof which is illustrated, by way of example, in the accompanying drawings, in which:

FIG. 1 a perspective view of a fireplace fuel stove and grill device according to the present invention and arranged for use in the cooking grill mode;

Figure 1:
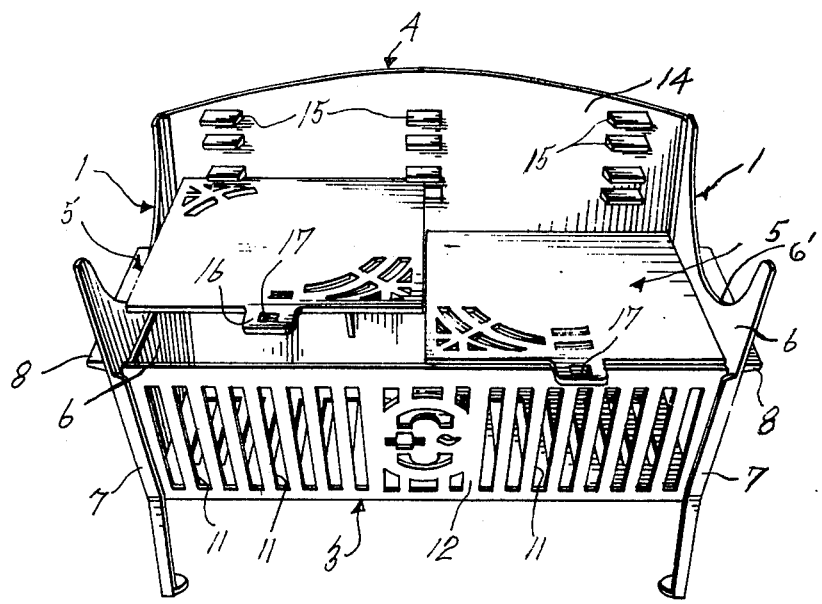
Figure 2:
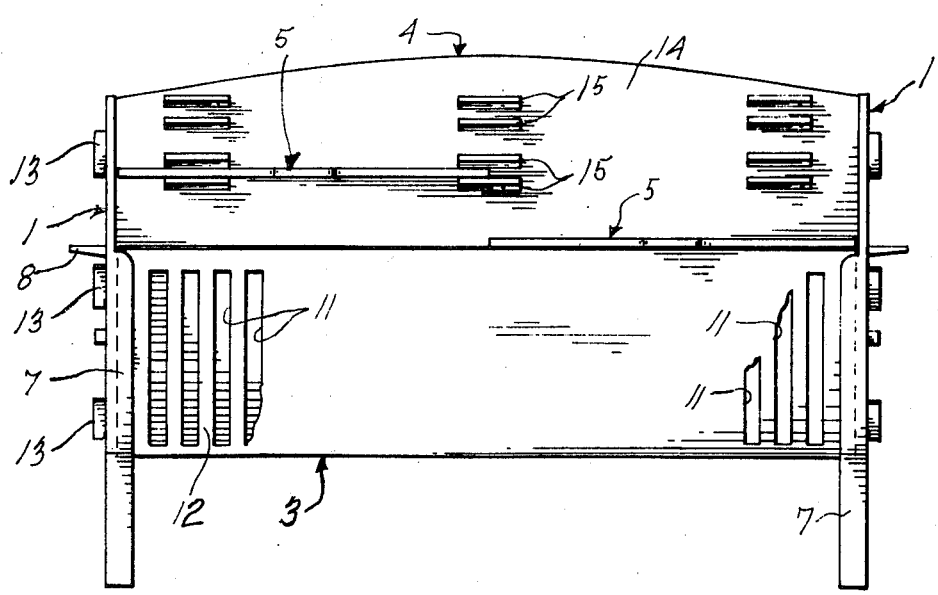
FIG. 2 is a front elevation view of the device of FIG. 1.
Figure 4:
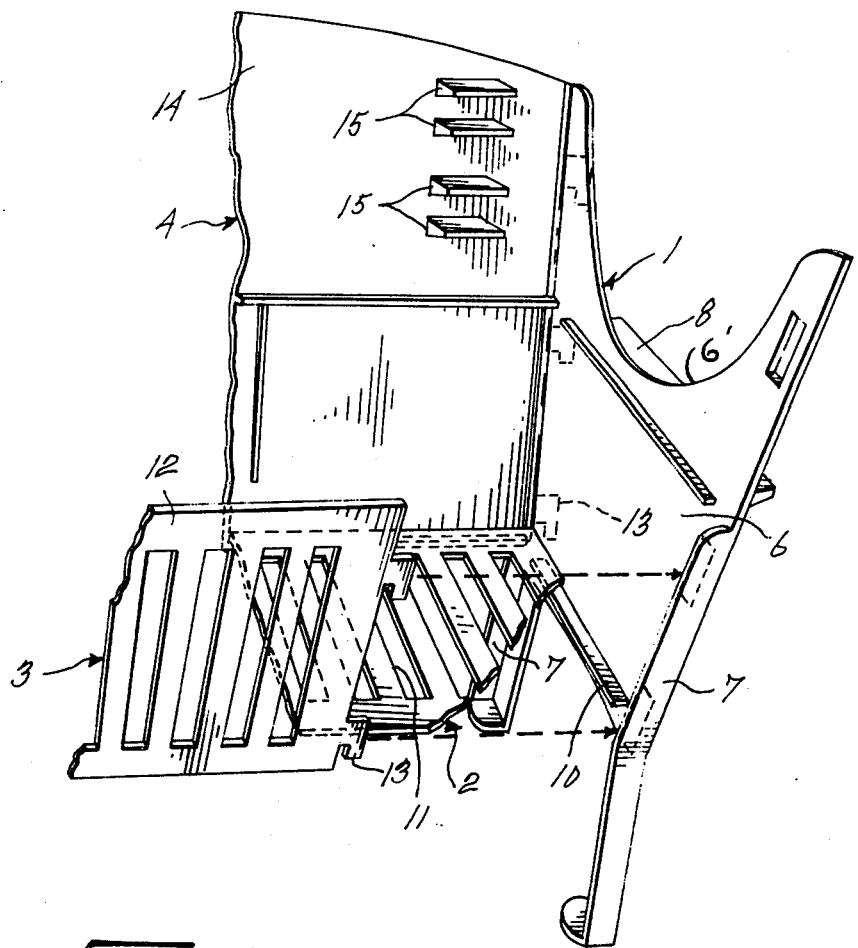
FIG. 4 is a partial elevation view of the device with parts broken away.
Figure 3:
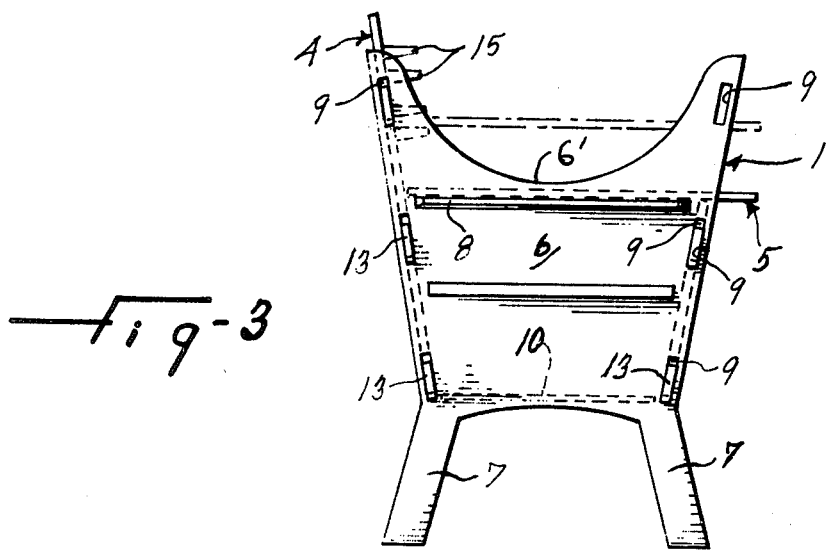
FIG. 3 is an end view of the fireplace fuel stove and grill device.

The illustrated fireplace fuel stove and grill device comprise a pair of opposite end members 1, a bottom 2, and opposite side members defining a front member 3 and a rear member 4. These members 1-4 cooperatively form a collapsible fireplace fuel stove. A grill in the form of two grill sections 5 cooperates with the members 1-4 to convert the latter for use as a portable cooking grill. Each of the members 1-4 and grill sections 5 is wholly made of metal to resist the heat when used in the fireplace.

Each of the opposite end members 1 includes a plate 6, a pair of flanges 7, and a projection 8 integrally made with the plate 6. The flanges 7 project from the inner face of the end plate 6 and longitudinally extend along the opposite front and rear edges respectively of the same end plate. Thus, as will be better understood later each flange 7 forms a corner for outward abutment of the corresponding side member 3 or 4 against it. The two flanges 7 of each plate 6 and the ends of plate 6 downwardly project to cooperatively form a pair of sturdy angle iron legs therewith. A projection 8 longitudinally extends transversely of the corresponding end plate 6 and projects from the outer face of the latter to form a handle for convenient handling of the fuel stove and grill device. Each plate 6 is formed with two or three slots 9 extending in series along and inward relative to the flanges 7.

The bottom and opposite side members 2, 3, and 4 extend longitudinally between the two end members 1 and are removably connecting to the latter to produce a knockdown fuel stove and grill device.

The bottom member 2 constitutes a plate operatively resting at each end on a ledge or transverse flange 10 projecting from the inner face of the corresponding end plate 6. The bottom plate member 2 is formed with elongated apertures of slots 11 longitudinally extending transversely relative to the bottom and side members 2, 3, and 4.

The front member 3 includes a plate 12 and pair of hooks 13 formed integral and coplanar with the plate 12 at each and thereof. The two hooks 12 at each end of the front plate 12 outwardly project and are spaced apart to removably lock into two slots 11 and is also absolutely flat to form a compact package assembly with the other member 1 and 4 when the components are knocked down.

The rear member 4 includes a plate 14 whose upper portion extends higher than the front member 3. The rear plate 14 is provided at each end with three hooks 13 formed integral and co-planar therewith and engaging in the corresponding slots 9 inward of and along the rear edges 7. The upper portion of the rear plate 14 has lugs 15 integrally formed therewith end forwardly projecting therefrom. These lugs or projections 15 are aligned and spaced apart to form slots into which the grill sections 5 are selectively engaged edgewise to rest in overlying relationship relative to the fireholding recess cooperatively defined by the members 1-4. Each grill section 5 may thus be selectively adjusted in height by engagement in one or the other of the above-mentioned slots.

Each grill section or plate 5 is apertured to allow roasting or grilling of the food thereon. Each grill section is also provided with a tongue 16 having an aperture 17 to handle the grill section by gripping this tongue has a handle or by engaging a stove handle in the aperture of the tongue.

The afore-described fireplace fuel stove is used in a fireplace and may be transported for outdoor use as a cooking grill. In the latter case, the device may be knocked down and compactly packed for less encumbrance in the car trunk or during transportation in general.

The upper edge of each end plate 6 is upwardly concave as shown at 6' to hold the ends of a log across the fire containing recess formed by the plate members 1-4.

What I claim is:

1. A fireplace log burning cooking stove comprising opposite end plate members, a bottom and opposite front and back plates extending length-wise between the opposite end plate members, and cooperatively forming therewith an upwardly opening fire holding recess, legs extending downwardly from said bottom plate member to maintain the same spaced above a supporting surface, said bottom and front plate members having elongated slots therethrough forming ventilation apertures, said end plate members and said back plate being imperforate, the upper edges of said end plates being concave to receive a log or logs and retain the same over and across said fire holding recess, said front and back plates downwardly converging longitudinally of the stove, said end plate members and said bottom, front and back plates being removably secured together, said back plate member including an upper imperforate portion projecting edgewise above said end plate members and said front plate and forming a series of pairs of superposed, spaced lugs on the inside face thereof, and further including a grill operatively and removably engageable edgewise in rest position between the lugs of anyone pair of said lugs for selective height adjustment of said grill over said fire holding recess.

* * * * *